United States Patent [19]
Griffin

[11] Patent Number: 4,930,362
[45] Date of Patent: Jun. 5, 1990

[54] WHEEL SPIN-UP TESTER

[75] Inventor: Cortland L. Griffin, Santa Ana, Calif.

[73] Assignee: McDonnell Douglas Corporation, Long Beach, Calif.

[21] Appl. No.: 361,485

[22] Filed: Jun. 5, 1989

[51] Int. Cl.⁵ .......................................... G01M 19/00
[52] U.S. Cl. .................................................. 73/865.3
[58] Field of Search ..................... 73/118.1, 2, 865.3

[56] References Cited
U.S. PATENT DOCUMENTS

| | | | |
|---|---|---|---|
| 2,425,289 | 8/1947 | Ward | 73/2 |
| 2,552,542 | 5/1951 | Duerr, Jr. | 73/2 UX |
| 3,363,446 | 1/1968 | Kaley | 73/2 |

Primary Examiner—Jerry W. Myracle
Attorney, Agent, or Firm—Curt L. Harrington; George W. Finch; John P. Scholl

[57] ABSTRACT

Disclosed is an advantageous device and method of simultaneously testing multiple wheel transducers, typically on modern aircraft, with the ability of performing the test remotely, as from the cockpit.

4 Claims, 4 Drawing Sheets

WHEEL SPIN-UP TESTER

BACKGROUND OF THE INVENTION

In the field of aircraft maintenance an advantageous position can be achieved by the elimination of the number of man-hours necessary to perform a given task. Previous methods of wheel transducer testing have included the requirements for a technician to manually force a drive cone, capable of spinning at one of several angular frequencies, into the open end of the wheel transducer in order to spin test the device. In other cases, a constant angular frequency driver is attached to a transducer to driven to a single frequency. Both of these types of systems have little ease of use and are labor intensive.

SUMMARY OF THE INVENTION

This invention involves a distributed apparatus and method for performing spin-up testing on multiple transducers, especially for use in the aircraft repair industry. A sealed transducer driver for each wheel is controlled by a central control panel. The central control panel has remote control access for remote control as from the aircraft cockpit. This type of remote control is especially advantageous in that it allows complete simultaneous testing to a high degree of reliability. Since the transducers are an integral part of the brake control system, more accurate testing will lead to greater aircraft reliability.

Brake systems typically rely upon wheel speed as an indicator of how much friction force to apply to each brake to prevent wheel locking and skidding. The locking of the brakes is a hazardous condition, especially on slick landing surfaces. The device and method of the present invention allows interactive testing from a single vantage point without the need for several people to operate the non-control aspect of wheel spin-up.

BRIEF DESCRIPTION OF THE DRAWINGS

The structure and method of operation of the invention, together with additional advantages thereof, will be best understood from the following description of specific embodiments when read in connection with the accompanying drawings in which.

DETAILED DESCRIPTION OF THE PREFERRED EMBODIMENT

Figure 1:
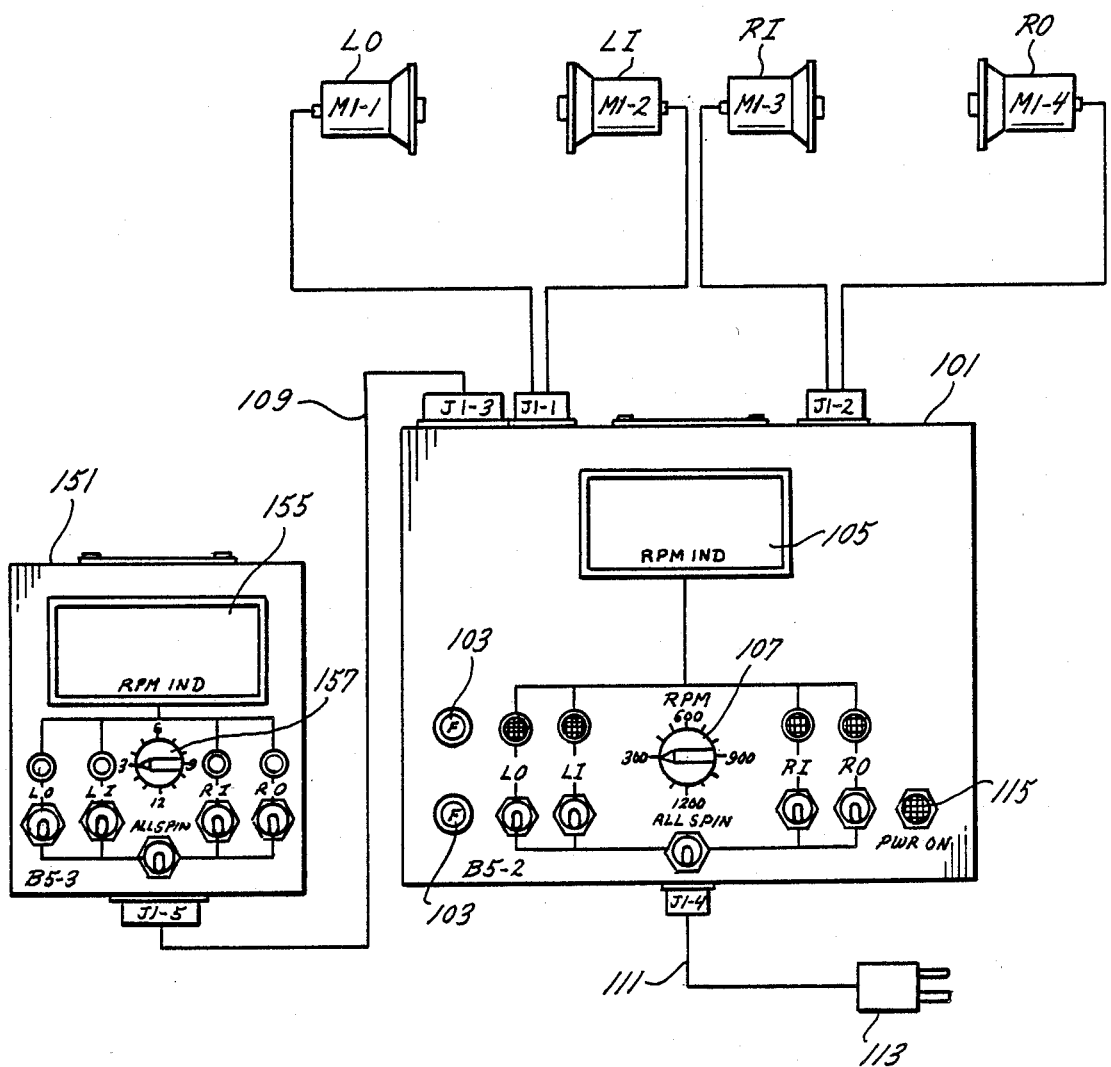
FIG. 1 is a general control flow schematic of the device and method of the present invention, including the remote control unit; and, FIG. 2 is a detailed schematic of the control panel and its relationship to the remote control unit of FIG. 1.

Referring to the FIG. 1, the overall scheme of implementation of the present invention is illustrated. For the purposes of illustration, four driver motors M1-1, M1-2, M1-3 and M1-4 operate spin transducers (not shown) on an aircraft corresponding to the left outboard (LO), left inboard (LI), right inboard (RI) and right outboard (RO) engines. The motors M1-1 and M1-2 are connected to a connector J1-1 of a central control panel 101. Likewise, the motors M1-3 and M1-4 are connected to a connector J1-2 of central control panel 101. Nominally, central control panel 101 will have a pair of fuse access ports 103, a digital readout view port 105, and a speed adjustment knob 107. Central control panel 101 also has four control switch-pilot lamp sets, labeled LO, LI, RI, and RO. In addition, a central switch labeled ALL SPIN is provided. Power is provided via a connector J1-4.

At the upper left of central control panel 101 is a connector J1-3 into which is connected one end of a remote control cable 109. Power is supplied to connector J1-4 via a power cord 111 terminated in a power plug 113. Central control panel 101 also has a power indicator light 115 at its lower right.

The other end of remote control cable 109 terminates at a connector J1-5 in a remote control panel 151. With the exception of the fuses 103 and power indicator light 115, the face of remote control panel 151 affords the same manner of control as central control panel 101. Remote control panel 151 has a digital readout view port 155, and a speed adjustment knob 157. Remote control panel 151 also has four control switch-pilot lamp sets, labeled LO, LI, RI, and RO. In addition, a central switch labeled ALL SPIN is provided, as was the case for central control panel 101.

Figure 2:
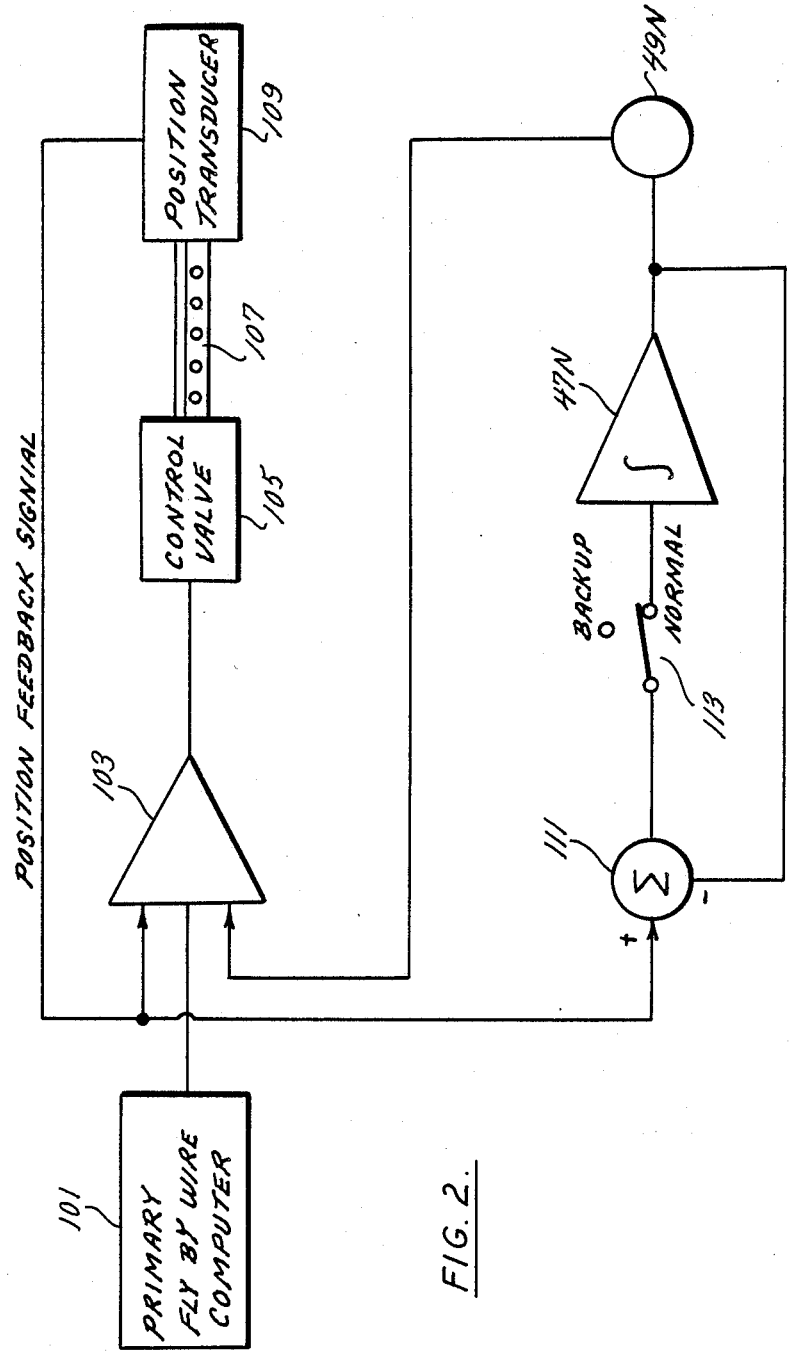
FIG. 2A and FIG. 2B show circuit details of the device of FIG. 1.
Figure 2A:
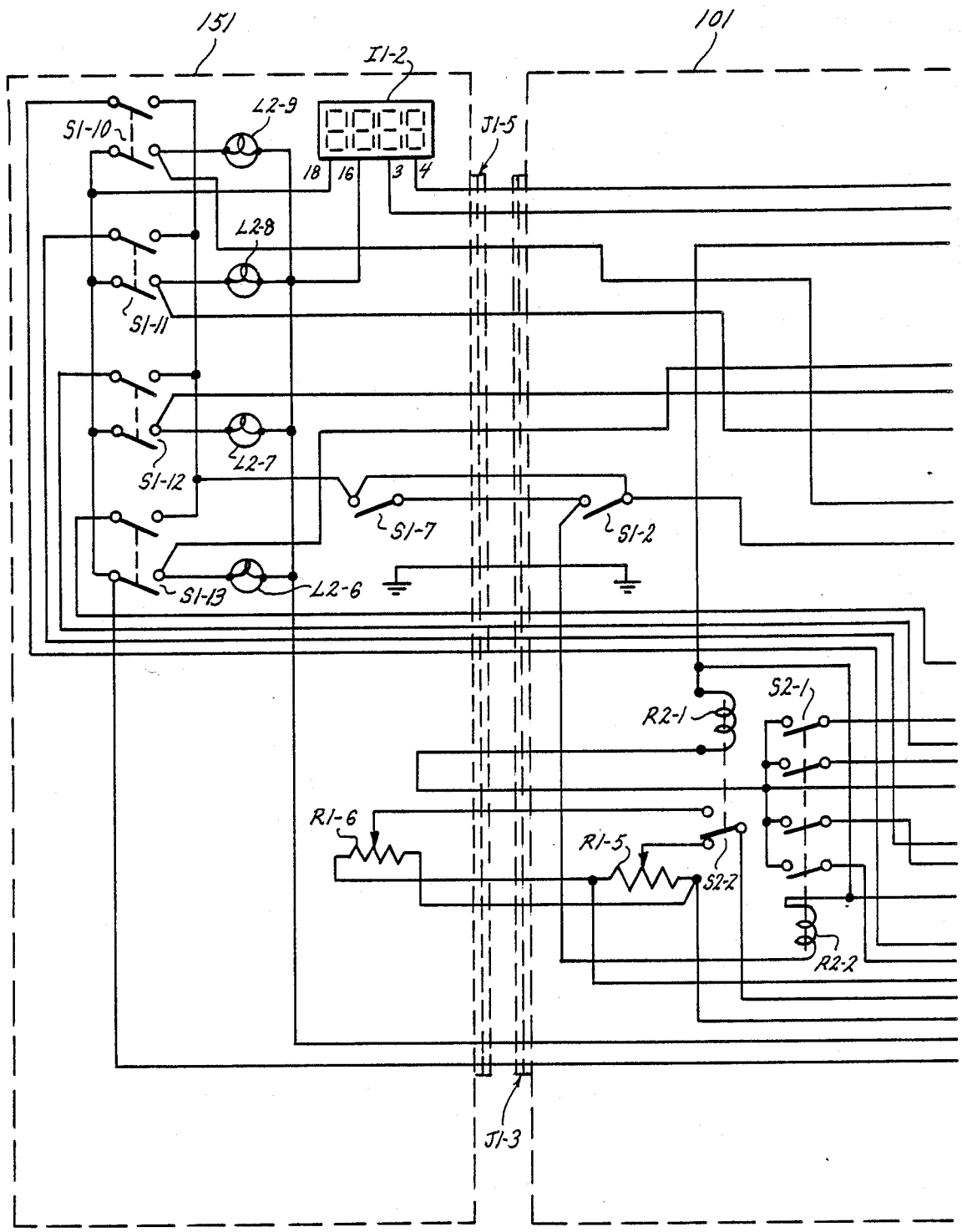
Figure 2B:
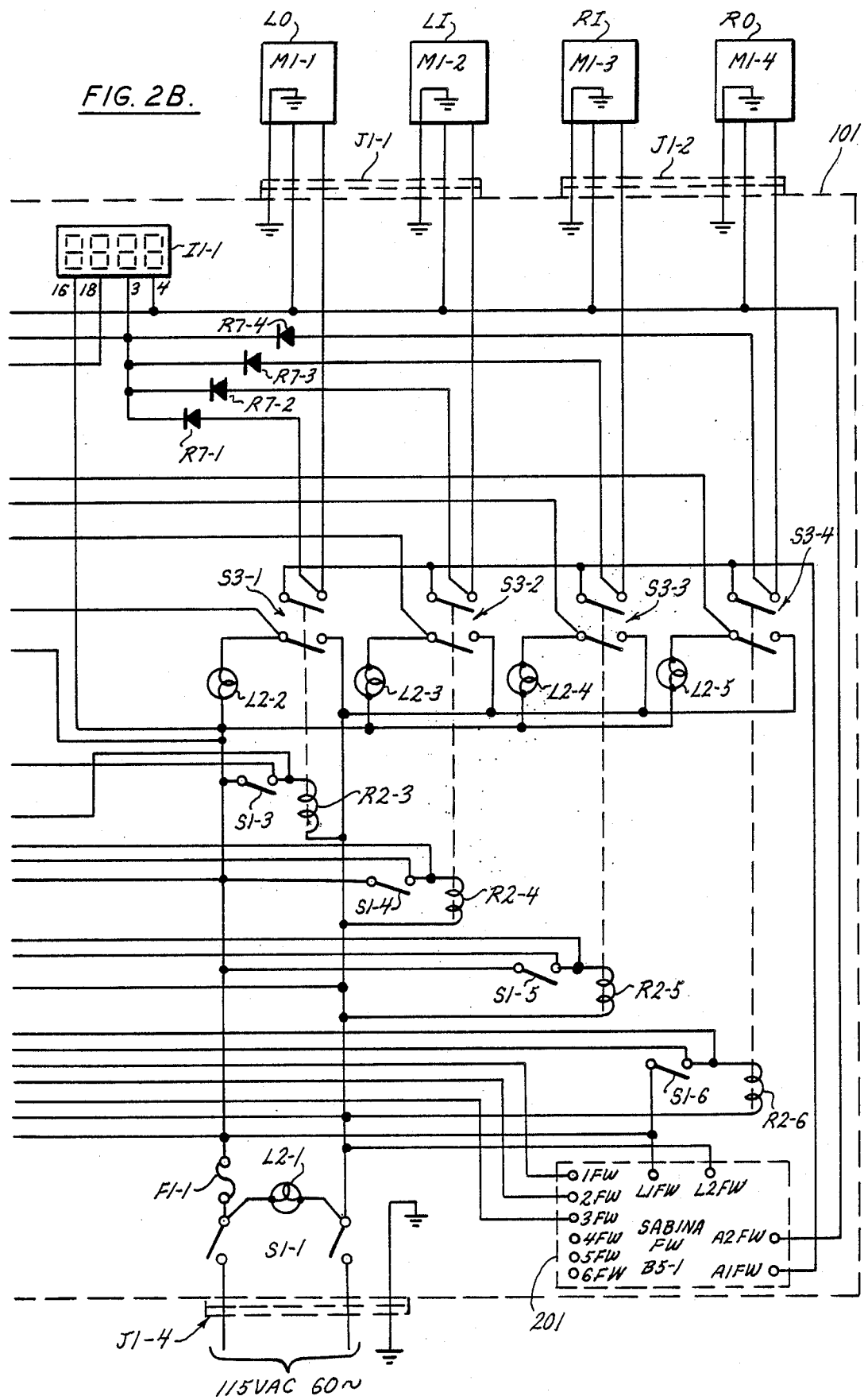

Referring to FIG. 2, a control schematic for the control system of FIG. 1 is shown. At the lower left corner of FIG. 2, a dashed box 201 indicates the existence of an adjustable speed drive, typically a Sabina "FW"-type drive. Sabina is a trademark of Sabina electric & engineering, Anaheim, Calif. This drive accepts a pair of nominal 115 volt lines, L1 and L2, and provides a pair of zero to 90 volt armature lines A1 and A2, and also provides a pair of 100 volt DC lines F1 and F2. At the bottom of FIG. 2, a 115 volt line, is connected to a double pole single throw switch S1-1. The other end of the left pole of switch S1-1 is connected to a fuse F1-1. The other end of fuse F1-1 is connected to L1FW, the 115 volt input to the adjustable speed drive 201. The other end of the right pole of switch S1-1 is connected to L2FW, also part of the 115 volt input to the adjustable speed drive 201.

A lamp L2-1, the power indicator light 115 of FIG. 1, is connected between the secondary poles of switch S1-1. The L2FW side of switch S1-1 is connected to one input of relay coils R2-1, R2-2, R2-3, R2-4, R2-5, and R2-6. The other side of coil R2-1 is connected to L1FW. The other side of R2-2 is connected to one pole of a single pole single throw switch S1-2. The other end of S1-2 is connected to L2FW.

The other side of relay coil R2-3 is connected to one end of a single pole single throw switch S1-3 and to one end of a single pole single throw switch S2-1. The other side of relay coil R2-4 is connected to one end of a single pole single throw switch S1-4 and to one end of a single pole single throw switch S2-1. The other side of relay coil R2-5 is connected to one end of a single pole single throw switch S1-5 and to one end of a single pole single throw switch S2-1. The other side of relay coil R2-6 is connected to one end of a single pole single throw switch S1-6 and to one end of a single pole single throw switch S2-1. Single pole single throw switch S2-1 is controlled by relay coil R2-2. The other side of S2-1 is connected to L1FW. Relay coil R2-1 controls a single pole double throw switch S2-2. S2-2 switches line 2FW between a center tap line to a variable resistor R1-5 and a center tap line to a variable resistor R1-6. The variable resistors R1-5 and R1-6 both have one end connected to line 3FW and their other end connected to line 1FW.

At the lower right hand portion of FIG. 2, the DC drive current is made available at A1FW and A2FW.

A1FW is connected to a first side of the first poles of contact switches S3-1, S3-2, S3-3, and S3-4, the contact switches controlled individually by relay coils R2-3, R2-4, R2-5, and R2-6, respectively. The other side of the first poles of contact switches S3-1, S3-2, S3-3, and S3-4 are connected to one side of the DC drive lines to drive motors LO, LI, RI, and RO, located at the top of FIG. 2. Completing the DC circuit through the motors LO, LI, RI, and RO, is a direct connection to A2FW.

The other first sides of the first poles of contact switches S3-1, S3-2, S3-3, and S3-4 are connected to diodes R7-1, R7-2, R7-3, and R7-4. The other ends of diodes R7-1, R7-2, R7-3, and R7-4 are connected to pin 3 of an LED register I1-2. Pin 4 of LED register I1-2 is connected to A2FW. Pin 18 of LED register I1-2 is connected to L2FW, and pin 16 of LED register I1-2 is connected to L1FW.

The first sides of the second poles of contact switches S3-1, S3-2, S3-3, and S3-4 are connected to L2FW. The second sides of the second poles of contact switches S3-1, S3-2, S3-3, and S3-4 are connected to lamps L2-2, L2-3, and L2-4, respectively. Note that the connection between S1-3 and R2-3 is connected to a terminal 1, the connection between S1-4 and R2-4 is connected to a terminal 2, the connection between S1-5 and R2-5 is connected to a terminal 3, the connection between S1-6 and R2-6 is connected to a terminal 4, and that the second sides of the second poles of contact switches S3-1, S3-2, S3-3, and S3-4 are connected to terminals 5, 6, 7, and 8 respectively.

At the left side of FIG. 2, the remote control unit 151 circuitry is demarked by dashed lines. Note that lines extending to remote control unit 151 are tapped off of lines within central control unit 101 rather than directly to a given source. An LED register I1-2 is connected in parallel with LED register I1-1.

Lamps L2-2, L2-3, L2-4, and L2-5 are connected in parallel with lamps L2-9, L2-8, L2-7, and L2-6 respectively. A first pole of double pole single throw contact switches S1-10, S1-11, S1-12, and S1-13 connect L1FW to terminals 4, 3, 2, and 1 of relay coils R2-6, R2-5, R2-4, and R2-3. A second pole of double pole single throw contact switches S1-10, S1-11, S1-12, and S1-13 connect L2FW to terminals 5, 6, 7, and 8, respectively. Lamps L2-9, L2-8, L2-9 and L2-10 are also connected to the second pole of double pole single throw contact switches S1-10, S1-11, S1-12, and S1-13, respectively. The other ends of lamps L2-9, L2-8, L2-9 and L2-10 are connected to L1FW. Note that R1-6, described earlier, is physically located within remote control unit 151. The forgoing disclosure and description of the invention are illustrative and explanatory thereof, and various changes in the mode of implementation of the control scheme, and variations thereon, types of control,(e.g., electrical, mechanical, pneumatic, etc.) as well as in the details of the illustrated embodiments may be made without departing from the spirit and scope of the invention.

What is claimed is:

1. A transducer tester system comprising:
   a power supply;
   a first rheostat, electrically connected to said power supply for controlling the electrical energy supplied by said power supply;
   at least one central control switch electrically connected to said rheostat;
   at least one drive motor, electrically connected to said at least one control switch, adapted to drive a transducer;
   at least one central indicator lamp, also electrically connected to each said control switch, to indicate activation of its associated drive motor;
   a central relay actuator electromagnetically linked to each said control switch; and,
   a central speed indicator electrically connected to said at least one drive motor.

2. The transducer tester system, as recited in claim 1, with a remotely locatable control panel further comprising:
   a second rheostat, electrically connected in parallel with said first rheostat;
   at least one remote control switch electrically connected in parallel with each said central control switch;
   at least one remote indicator lamp, electrically connected to each said remote control switch, to indicate activation of its associated drive motor; and,
   a remote speed indicator electrically connected to said at least one drive motor.

3. The transducer tester system, as recited in claim 2 further comprising a master power switch, connected to said power supply, to control the admission of electrical power to said transducer tester system.

4. The transducer tester system, as recited in claim 3 having four central control switches, four drive motors and four indicator lamps.

* * * * *